United States Patent [19]

Persyk et al.

[11] Patent Number: 4,810,885
[45] Date of Patent: Mar. 7, 1989

[54] HEATED SCINTILLATOR

[75] Inventors: Dennis E. Persyk, Barrington; William White, Cary, both of Ill.

[73] Assignee: Siemens Gammasonics, Inc., Des Plaines, Ill.

[21] Appl. No.: 913,798

[22] Filed: Sep. 30, 1986

[51] Int. Cl.⁴ ............................................. G01T 1/164
[52] U.S. Cl. .................................. 250/363.02; 250/369; 250/363.01
[58] Field of Search ................ 250/363 R, 363 S, 369, 250/367, 366

[56] References Cited

U.S. PATENT DOCUMENTS

| | | | |
|---|---|---|---|
| 3,904,530 | 9/1975 | Martone et al. | 250/369 |
| 4,303,860 | 12/1981 | Bjorkholm et al. | 250/363 S |
| 4,398,092 | 8/1983 | Carlson | 250/363 R |
| 4,455,616 | 6/1984 | Inbar | 250/369 |
| 4,489,236 | 12/1984 | Octhwaite | 250/369 |
| 4,511,799 | 4/1985 | Bjorkholm | 250/367 |

FOREIGN PATENT DOCUMENTS 2543691 10/1984 France ................................ 250/367

OTHER PUBLICATIONS

Wong et al, "Characteristics of Small Barium Fluoride (BaF₂) Scintillator for High Intrinsic Resolution Time-of-Flight Position Emission Tomography", IEEE Trans. Nucl. Sci., NS-11 (1), Feb. 1984, pp. 381-386.

Primary Examiner—Carolyn E. Fields
Attorney, Agent, or Firm—Mark H. Jay

[57] ABSTRACT

A scintillation crystal is heated. A temperature gradient is established across a scintillation crystal inside a scintillation camera system. The decay time of a scintillation flash is related to the temperature of the site at which the corresponding scintillation event takes place. By monitoring the decay time of detected scintillation flashes, as by differentiation, the depth of the scintillation event within the scintillation crystal is determined, thereby leading to improved spatial resolution and improved energy resolution.

7 Claims, 3 Drawing Sheets

TEMPERATURE DEPENDENT CsI(Na) DECAY

HEATED SCINTILLATOR

BACKGROUND OF THE INVENTION

The invention relates to scintillators, and more particularly relates to scintillation cameras which produce images of a patient under investigation. In its most advantageous application, the invention relates to scintillation cameras which produce tomographic images.

In imaging applications, a scintillation flash is associated with an X-Y position (referenced to the plane of the sensitive surface of the scintillator). However, a scintillator is not infinitesimally thin, and as a result, the apparent X-Y location of a scintillation flash may be, and usually is, different from the location of the scintillation event which generated the flash. Accordingly, to precisely locate the situs (and thus the true X-Y position) of a scintillation event, both the apparent X-Y position of the resulting flash and the depth of the event within the scintillator must be known.

While the photodetectors which detect scintillation flashes are set up to register the apparent X-Y position of a scintillation flash, no method is known by which a single photodetector can be used to determine the depth of a scintillation event within the scintillator. The inability to determine this depth places a limitation on the precision with which a scintillation event can be localized within the X-Y plane. This in turn limits the spatial resolution of images produced by the imaging camera.

Even where X-Y position information is unimportant, such as in oil well logging, it is still useful to determine the depth of a scintillation event within a scintillator. This is because the output of light from a scintillator is a function of the depth of the scintillation event within the scintillator. The energy of incident radiation affects the intensity of a scintillation flash and this energy can be better estimated by correcting for the depth dependence of light output from the scintillator. Consequently, energy resolution can be improved if the depth of a scintillation event within a scintillator is known. The improvement can be significant in, e.g., scintillators which are used in oil-well logging, because such scintillators are usually very thick.

It would therefore be advantageous to determine the depth at which incoming radiation interacts with a scintillator to produce a scintillation event.

One object of the invention is to provide a scintillator system which is so designed that the depth of a scintillation event within the scintillator can be determined.

A further object is to provide a scintillation camera system which utilizes the depth so determined in production of a planar or tomographic image.

Another object is, in general, to improve on known devices and techniques.

SUMMARY OF THE INVENTION

The invention proceeds from a realization that heated scintillators have advantageous characteristics. In particular, a heated scintillator produces scintillation flashes which decay faster than do flashes produced by a scintillator at room temperature, and the effective count rate of a scintillation camera system can be increased merely by heating the scintillator in an otherwise conventional scintillation camera head because the faster flash decay reduces pulse pile-ups.

The invention also proceeds from a realization that the decay time of scintillation flashes varies with the temperature of the scintillator at the site of the event which generated the flash. More specifically, a scintillation flash from an event which takes place at a site held at 20° C. decays more slowly than does a scintillation flash from an event which takes place at a site held at 80° C.

In a preferred embodiment of the invention, a temperature gradient is established across the depth of the scintillator i.e. normal to its input and output surfaces within a center domain of the scintillator. Furthermore, in the preferred embodiment of the invention the decay time of detected scintillation flashes is monitored. This may advantageously be done by (a) differentiating the normalized output from the photodetectors which are used to detect the flashes from scintillation events within the scintillator or (b) timing the decay of the flash. Because the decay time of each scintillation flash is related to the temperature of the scintillator at the site of the corresponding scintillation event, it follows that the temperature of the scintillator at the site of the scintillation event can be determined. Since this temperature is in turn related to the depth of the site within the scintillator, it follows that the measurement of decay time of a detected scintillation flash represents the depth of the site of the corresponding scintillation event within the scintillator. Hence, the depth of the event within the scintillator can be determined for each scintillation event which generates a flash. This additional information can be taken into account in production of the finished image (or, if no image is formed, in interpretation of the data generated by the event).

A determination of the depth of a scintillation event within a scintillator is also useful because this permits the energy resolution of a scintillation camera system to be improved.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

In the following description, reference will be made to scintillation "events" and scintillation "flashes". While these terms are occasionally used interchangeably, the term "event" will be used herein to indicate the actual interaction of radiation with a scintillator, and the term "flash" will be used herein to refer to the light produced by an "event". The difference may be understood by noting that some scintillation events do not produce scintillation flashes; sound and heat are produced instead.

Figure 1:
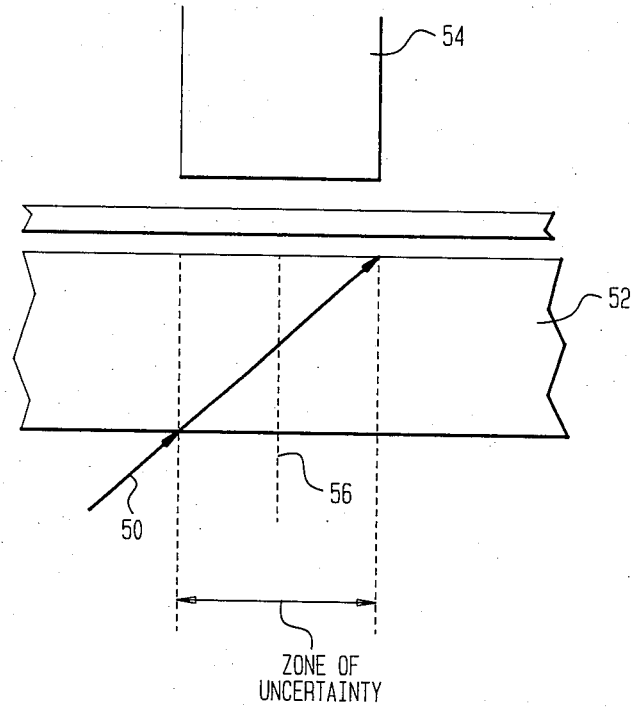
FIG. 1 schematically illustrates the degradation of spatial resolution in a scintillation camera which is caused by lack of information about the depth of a scintillation event within a scintillation crystal.

FIG. 1 illustrates the problems in spatial resolution which arise where a scintillator is relatively thick and/or where incident radiation strikes the scintillator at other than substantially right angles.

Where an incident ray 50 travels or can travel a substantial distance within the scintillator 52, a detection of the resulting scintillation flash will only approximately locate the scintillation event. This is because a photodetector 54 can detect the presence or absence of flashes which occur within the illustrated zone of uncertainty, but cannot locate them within that zone. Instead, it is assumed that the corresponding scintillation event occurred in the center 56 of the zone.

However, where the information from the photodetector includes information about the depth of the scintillation event, a more precise location of that event within the zone is made possible. It will be clear from FIG. 1 that where the depth of the event is known, the location of the site of the event can be precisely determined.

Figure 2:
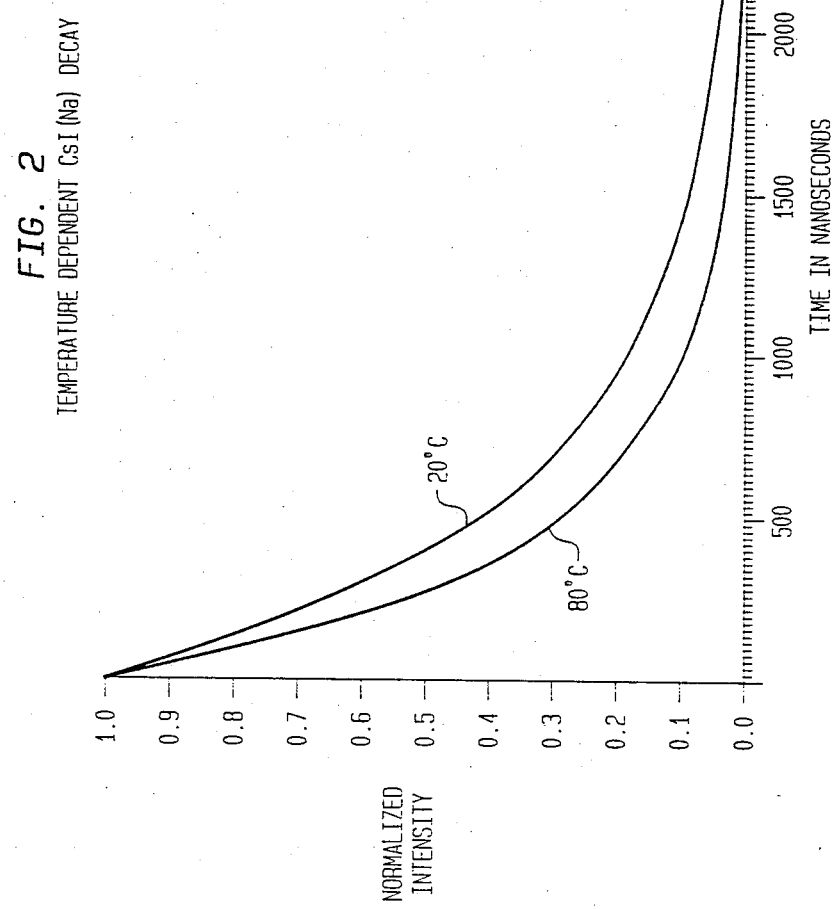
FIG. 2 is an illustrative graph showing the relationship between the decay time of a scintillation flash and the temperature of the site at which the corresponding scintillation event takes place.

Some basic theory related to a preferred embodiment of the invention will now be discussed in connection with FIG. 2. (FIG. 2 is illustrative; it may be but need not be typical.) The data in FIG. 2 was derived from the normalized electrical output of a phototube which was used to measure the intensity of scintillation flashes occuring in a CsI(Na) scintillator. As is shown there, a scintillation flash produced in a scintillator which is at 20° C. decays more slowly than does a flash produced in a scintillator at 80° C. As a result, by normalizing and differentiating the output of the photodetectors with respect to time, the instantaneous rate of decay of the scintillation flash and therefore the temperature of the site at which the corresponding scintillation event occurs can be determined. Alternatively, the flash may be timed.

In accordance with a preferred embodiment of the invention, a temperature gradient is established normal to the input and output surfaces of a scintillation crystal so that the depth of a scintillation event within the scintillator can be determined. (It will be understood that cooling effects at the periphery of the scintillator will prevent the gradient from being normal to these surfaces except in a center domain of the scintillator. Outside this center domain, the information produced by this preferred embodiment is less useful, and may be ignored.) A preferred embodiment of apparatus for achieving this is schematically illustrated in FIG. 3.

As is shown there, a scintillation camera system (otherwise not shown, but including such standard features as a computer, a CRT display, and a keyboard) includes a scintillation crystal 2. The crystal 2 is any of the scintillation materials used in nuclear medicine, advantageously BGO, NaI(Tl) or CsI(Na). The crystal 2 is contained within a housing 4 of, e.g. aluminum and is surrounded on its input surface and its peripheral surface by an air gap 10. Inside the housing is a reflector 8 of Teflon or e.g. MgO paint, to reflect scintillation light back towards the crystal 2. On the input side of the scintillator 2, on the outside of the housing 4, is located a heater 6 which is advantageously made of a fiberglass heat tape.

In the preferred embodiment, the heater 6 is located on the outside of the housing 4, so the heater 6 can be replaced if necessary, but the heater 6 may be located inside the housing 4 if desired. The heater 6 is advantageously spaced from the crystal 2 to avoid subjecting the crystal 2 to thermal shock when the heater 6 is energized through wires 12.

Figure 3:
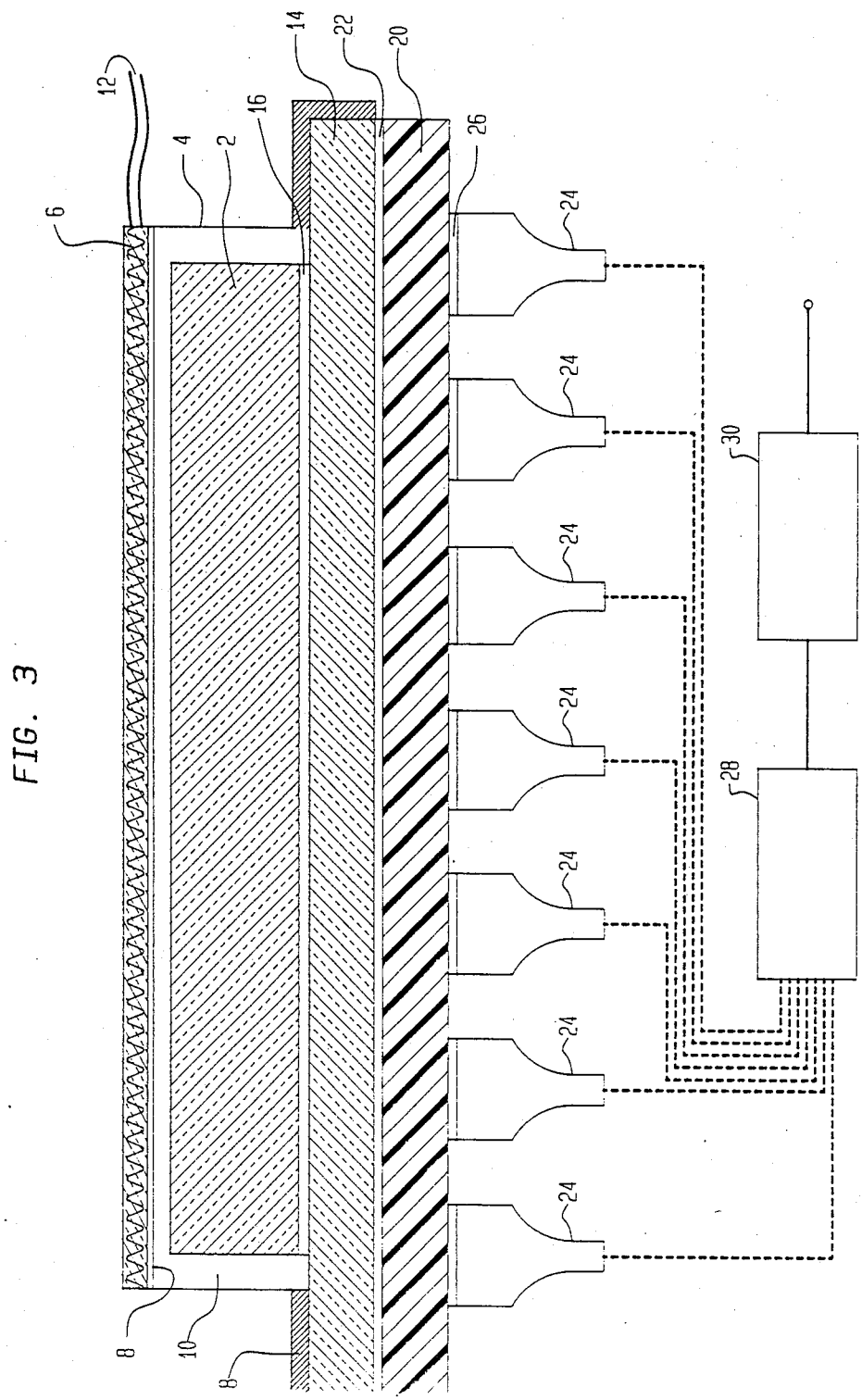
FIG. 3 is a schematic illustration of a scintillation camera head in accordance with a preferred embodiment of the present invention.

FIG. 3 is not to scale, and various parts have been enlarged for clarity. Because the spatial resolution of a scintillation camera degrades as the spacing between the patient (not shown) and scintillation crystal increases, it is advantageous to make the heater 6 and housing 4 as thin as is feasible. In this connection, it is preferable to make the heater 6 of a multiplicity of fine conductors (not shown), rather than as a smaller number of larger conductors. This is to minimize the likelihood that the conductors will be imaged during use.

The crystal 2 is fixed to a substrate 14 by a bonding material 16, and the housing 4 is secured to the substrate 14 by a hermetic seal 18. Advantageously, the material 16 is a two-part RTV (room-temperature vulcanizing) silicone rubber, and the substrate 14 is advantageously Pyrex glass, but these materials are not part of the invention. The apparatus shown in FIG. 3 is, with the exception of the heater 6, entirely conventional.

A light pipe 20 is attached to the substrate 14 by a bonding agent 22, and a plurality of photodetectors 24 (in this example, these are phototubes but they could also be avalanche photodiodes) are mounted to the light pipe 20 through a bonding agent 26. This places the photodetectors 24 in optical communication with the output surface of the crystal 2. The bonding agents 22 and 26 are advantageously silicone grease, but this is conventional and it will be understood that the structure by which the phototubes 24 are placed in optical communication with the output surface of the scintillation crystal 2 is not part of this invention.

Heat from the heater 6 is supplied to the input surface of the scintillation crystal 2 and the input surface of the crystal 2 is kept at a predetermined temperature which in this example is 80° C. (This temperature was chosen because it can be implemented in a conventional scintillation camera head as manufactured by Siemens Gammasonics, Inc. without requiring any substantial redesign work, but it is not necessary to the invention.) Most of the heat leaves the crystal 2 through its output surface and is radiated to the outside through the light pipe 20 and the aluminum housing 4. The materials and thicknesses of the various components should be such that a temperature difference of approximately 60° C. exists between the input and output surfaces of the crystal 2 and varies (approximately linearly) between them.

When a scintillation flash is detected by the photodetectors 24, the output signal representing the flash is analyzed to determine the rate at which the flash decays. One preferred method of carrying out this analysis is to normalize the pulse height of the output signal and then to differentiate it with respect to time. Another preferred method is to time the duration of the flash or of the decay of the flash. The appropriate operations are carried out by a circuit 28. (Normalization, differentiation and timing are standard circuit functions and the details of circuit 28 have therefore been omitted.) Circuit 28 produces an intermediate result which, when input to an appropriate look-up table 30 or other memory, produces output representing the depth of the scintillation event within the crystal 2. This information is then routed to the reconstruction computer (not shown) which uses it, together with information about the location and energy of the event, to reconstruct the final image.

The term "output signal", as used herein, does not refer to the direct output of each of the photodetectors 24. Normally, a flash is detected by more than one photodetector 24 and the outputs of all affected photodetectors 24 are combined to produce a composite signal (which itself contains composite location and intensity information characterizing the event). The term "output signal" refers to the electrical signal which contains the intensity information.

As a consequence of the increased rate of decay of scintillation flashes which is associated with elevated temperature of the scintillator, the effective count rate of the scintillation camera system is increased. This is because pulse pile-up—the overlapping of two successive scintillation flashes—is less likely to occur when the flashes decay more rapidly. Since the electronics of a scintillation camera system is conventionally set up to reject counts from pulse pile-ups, the effective count rate of the system is increased because the likelihood of pile-ups is diminished.

Those skilled in the art will understand that changes can be made in the preferred embodiments here described, and that these embodiments can be used for other purposes. Such changes and uses are within the scope of the invention, which is limited only by the claims which follow.

What is claimed is:

1. A scintillation camera, comprising:
   a scintillation crystal having a surface which is exposed to incident radiation; and
   means for establishing a temperature gradient across a center domain of said crystal along a direction which is perpendicular to said surface.

2. A scintillation camera, comprising:
   a scintillation crystal having an input surface which is exposed to incident radiation;
   a plurality of photodetectors which are in optically communicative relationship with an output surface of the crystal, the input and output surfaces being parallel to each other;
   means for establishing a temperature gradient across the crystal along a direction which is perpendicular to said surfaces in a center domain of the crystal; and
   means for determining the decay times of pulses which are produced by the photodetectors in response to scintillation events in the scintillation crystal.

3. The camera of claim 2, wherein the crystal is CsI(Na).

4. The camera of claim 2, wherein the crystal is NaI(Tl).

5. The camera of claim 2, wherein the crystal is BGO.

6. The camera of claim 2, wherein the temperature gradient is generally linear between approximately 80° and 20° C.

7. The camera of claim 2, wherein said determining means comprises a differentiation and normalization circuit which produces a normalized output representative of the slope of the pulse immediately adjacent its peak.

* * * * *